United States Patent [19]
Sato

[11] Patent Number: 5,363,254
[45] Date of Patent: Nov. 8, 1994

[54] TAPE RECORDER CAPABLE OF VARYING TAPE SPEED

[75] Inventor: Hitoshi Sato, Kanagawa, Japan

[73] Assignee: Canon Kabushiki Kaisha, Tokyo, Japan

[21] Appl. No.: 178,636

[22] Filed: Jan. 7, 1994

Related U.S. Application Data

[63] Continuation of Ser. No. 748,644, Aug. 22, 1991, abandoned.

[30] Foreign Application Priority Data

Aug. 27, 1990 [JP] Japan .................. 2-222432

[51] Int. Cl.⁵ .................................. G11B 15/46
[52] U.S. Cl. .................. 360/73.05; 360/73.06; 360/73.08; 377/2; 377/45
[58] Field of Search .............. 360/73.01, 73.03, 73.04, 360/73.05, 73.06, 73.08; 377/2, 45

[56] References Cited

U.S. PATENT DOCUMENTS

| | | | |
|---|---|---|---|
| 3,967,898 | 7/1976 | Klann | 355/110 |
| 4,611,252 | 9/1986 | Igata et al. | 360/73.08 |
| 4,782,405 | 11/1988 | Imai | 360/73.06 |
| 4,791,507 | 12/1988 | Doyama et al. | 360/73.08 |
| 5,121,267 | 6/1992 | Wesolowski | 360/67 |

Primary Examiner—John S. Heyman
Attorney, Agent, or Firm—Robin, Blecker, Daley & Driscoll

[57] ABSTRACT

A tape recorder comprises a reproducer for reproducing an information signal recorded on a tape-shaped recording medium, a transporter for transporting the tape-shaped recording medium, a dial and a controller for setting a transport speed of the tape-shaped recording medium at one of a plurality of speeds according to a rotation phase angle of the dial, the controller being arranged to be operable while the reproducer is in operation and establishing a plurality of predetermined specific speeds within the plurality of speeds having a relatively greater phase angle of rotation of the dial than the phase angle rotation of the dial for the plurality of speeds not at the predetermined specific speeds.

20 Claims, 3 Drawing Sheets

TAPE RECORDER CAPABLE OF VARYING TAPE SPEED

This is a continuation application under 37 CFR 1.62 of prior application Ser. No. 748,644, filed Aug. 22, 1991 now abandoned.

BACKGROUND OF THE INVENTION

1. Field of the Invention

This invention relates to a tape recorder and more particularly to a tape recorder which is capable of varying a tape speed.

2. Description of the Related Art

With regard to a video tape recorder (hereinafter referred to as a VTR) having editing functions, the functions for speedily finding a position where editing is performed on a tape, i.e., an editing point, include a jog function, a shuttle function and a variable function.

These functions are generally arranged to be carried out with a tape transporting action controlled by operating and turning a dial which is provided on an operation panel of the VTR.

First, in the case of the jog function, a tape transport speed varies with the rotation speed of the dial. In other words, the tape is transported at a high speed when the dial is turned at a high speed. The tape transport speed becomes slower when the rotation speed of the dial is lowered.

In the case of the shuttle function or the variable function, the tape transport speed changes according to the rotation angle (rotation phase) of the dial. The tape transport speed is high if a phase difference from a rotation phase corresponding to a zero speed is large, and the tape transport speed is low if the phase difference is small.

Generally, the same dial is used for the jog function and the variable or shuttle function in common. The selection of these functions is changed from one over to the other by means of a change-over switch which is provided separately from the dial.

A difference between the variable function and the shuttle function is as follows: a function whereby a reproduced image having no noise bar is obtainable at any tape transport speed with a VTR designed for business use or the like is called the variable function. A function whereby a noise bar appears in a reproduced image when the image is reproduced at a high speed with a home VTR or the like is called the shuttle function.

Meanwhile, the VTRs of the kind having the shuttle function or the variable function are arranged in general to have the rotation angle (rotation phase) of the dial in a relation to the tape transport speed as shown in FIG. 1. As shown, the tape transport speed changes from one speed over to another every time the rotation angle of the dial changes a given degree.

In a case where the VTR is arranged to permit the tape transport speed to be set at any of many different speeds, a range of dial rotation angles (rotation phases) corresponding to each tape transport speed becomes extremely narrow. In such a case, therefore, the tape transport speed changes when the dial is turned only to a very small degree. Hence, the dial operation has been very difficult for the user in setting the tape transport speed at a desired speed value.

SUMMARY OF THE INVENTION

It is a general object of this invention to solve the above-stated problem.

It is a more specific object of the invention to provide a tape recorder which is of the kind permitting a manual selection of any desired speed from among different variable speeds and is arranged to permit manual setting of the tape transport speed with ease at a desired value.

Under this object, a tape recorder which is arranged according to this invention as an embodiment thereof comprises reproducing means for reproducing an information signal recorded on a tape-shaped recording medium; transport means for transporting the tape-shaped recording medium; a dial; and control means for setting a transport speed of the tape-shaped recording medium transported by the transport means at one of a plurality of speeds according to a rotation phase of the dial. The control means is arranged to be operable while the reproducing means is in operation. A range of rotation phases of the dial corresponding to each of the specific speeds included in the plurality of speeds is arranged to be wider than that corresponding to each of the speeds other than the specific speeds.

The above and other objects and features of the invention will become apparent from the following detailed description of an embodiment thereof taken in conjunction with the accompanying drawings:

DETAILED DESCRIPTION OF THE PREFERRED EMBODIMENT

Figure 1:
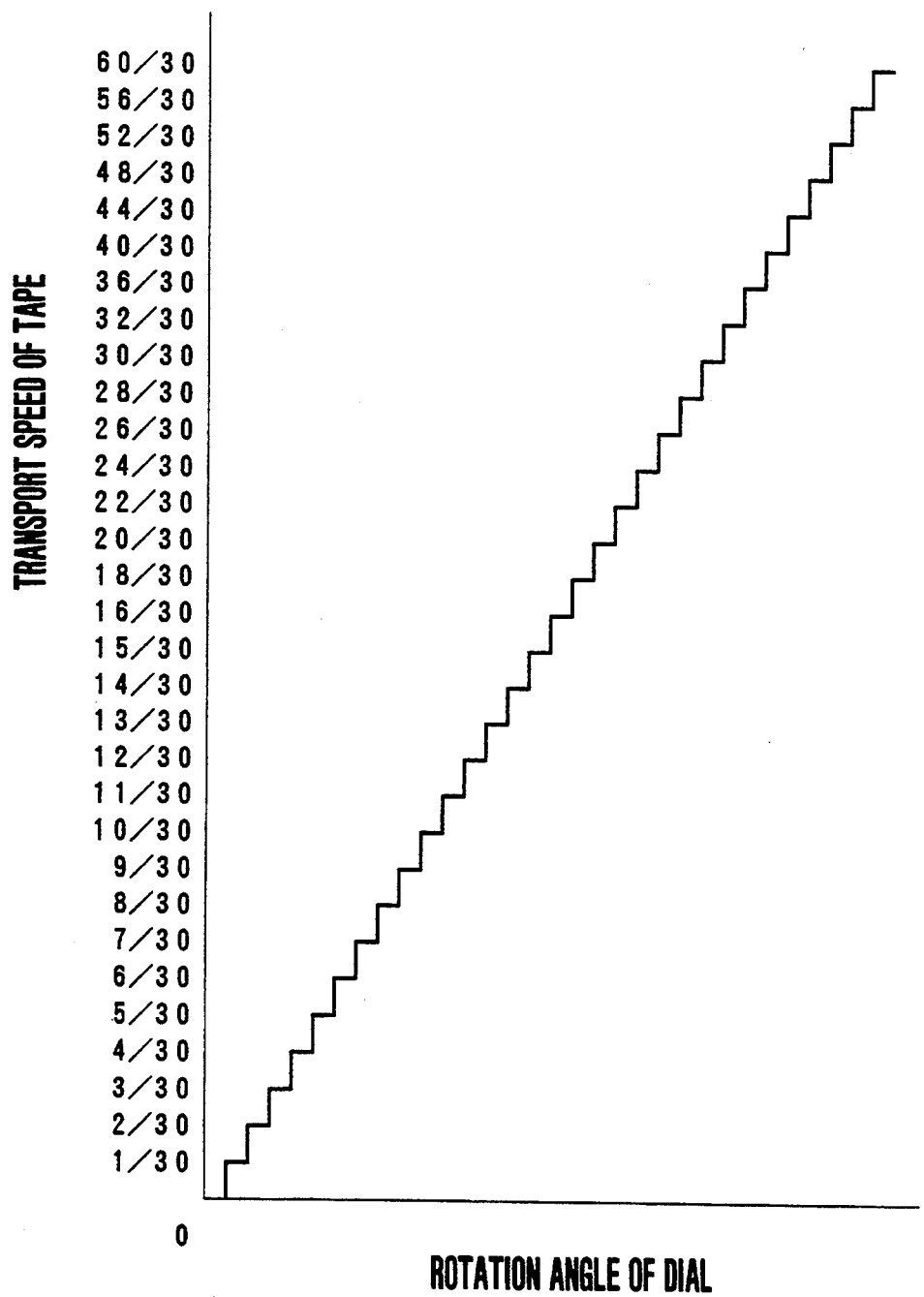
FIG. 1 shows the relation of dial rotation angles (rotation phases) to tape transport speeds obtainable with the conventional VTR of the kind having the shuttle or variable function.
Figure 2:
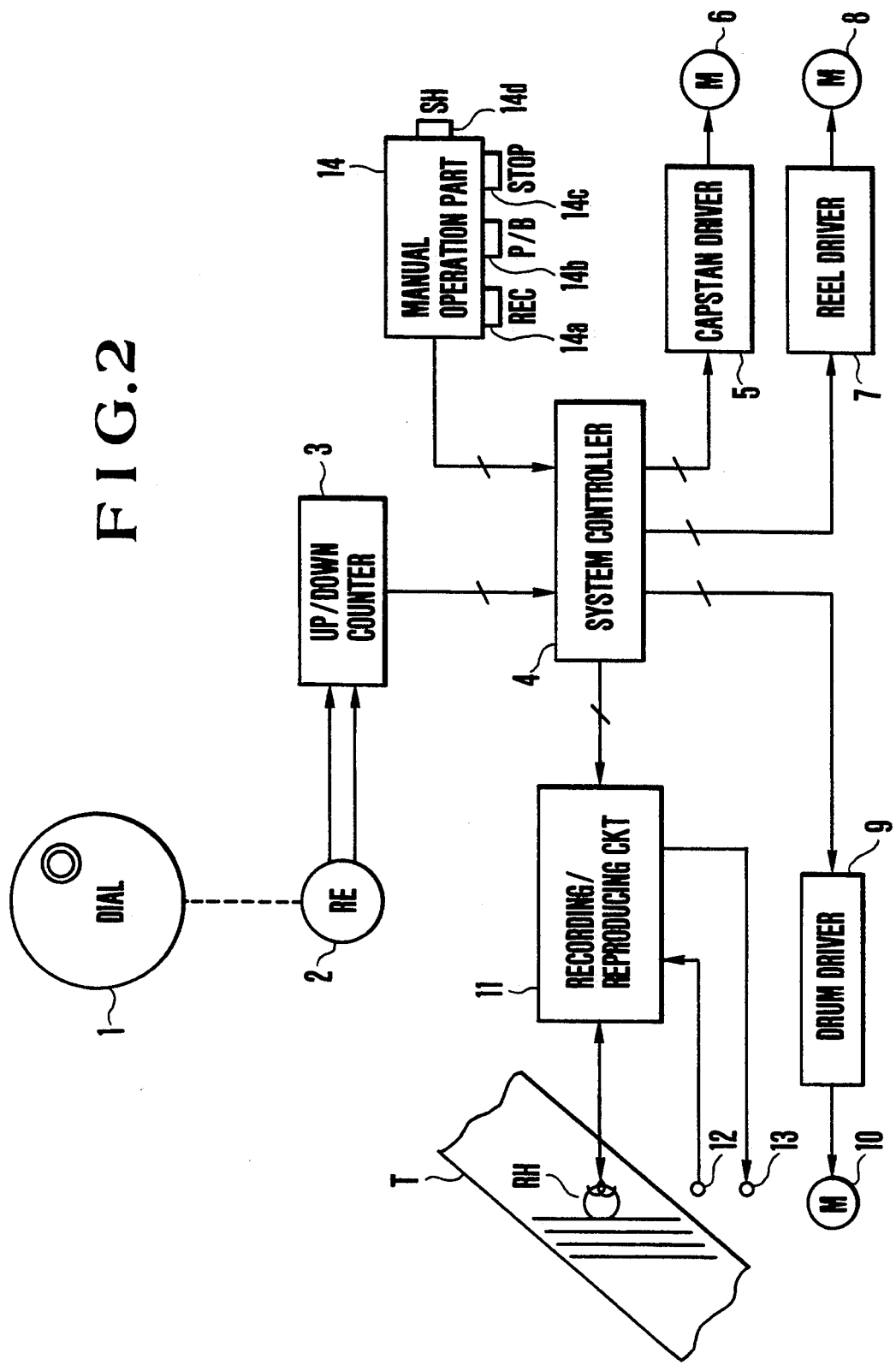
FIG. 2 is a block diagram showing in outline the arrangement of a VTR which is arranged according to this invention as an embodiment thereof.
Figure 3:
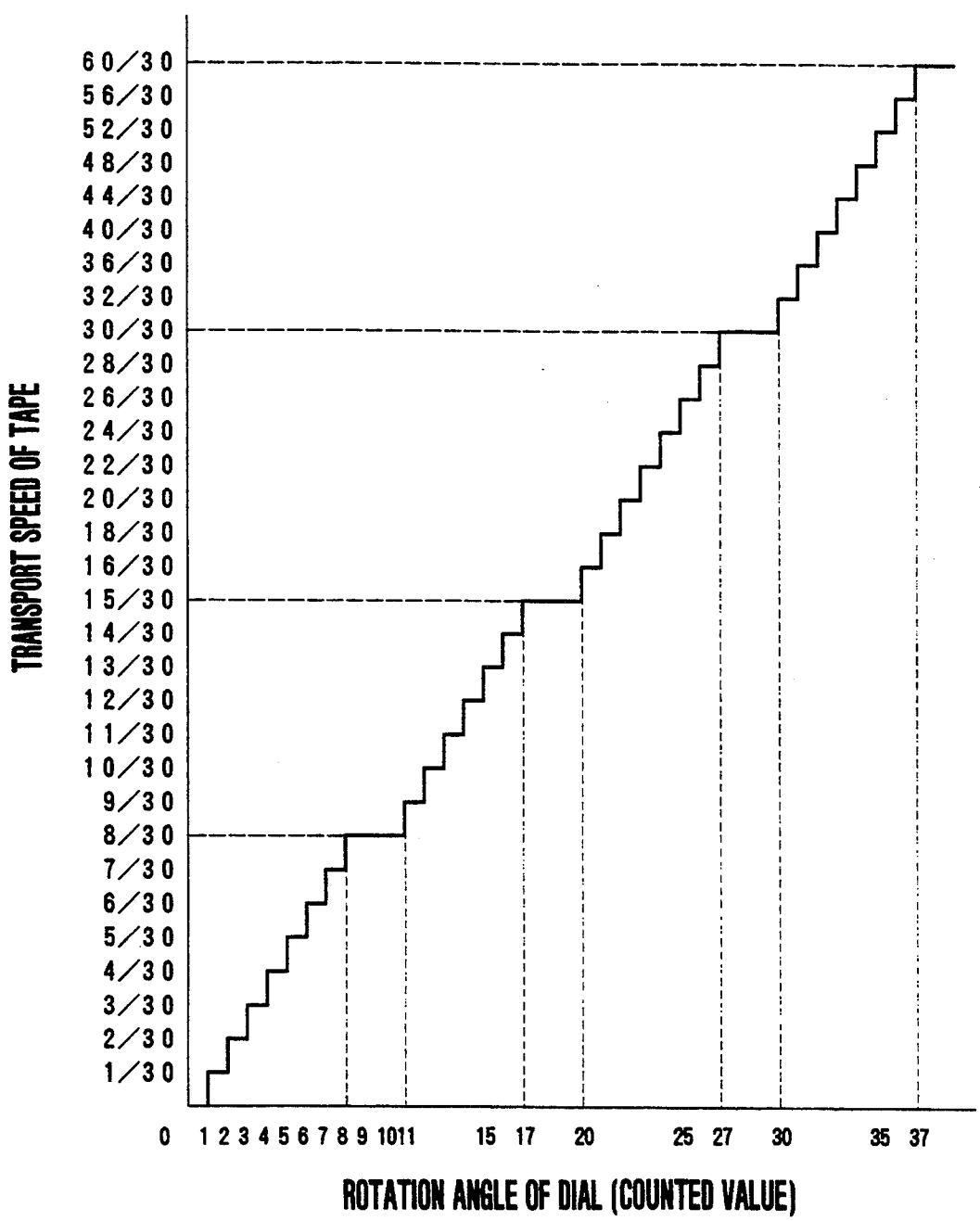
FIG. 3 shows the relation of dial rotation angles (rotation phases) to tape transport speeds obtainable with the VTR of FIG. 2.

The details of an embodiment of this invention are described as follows:

FIG. 2 is a block diagram showing in outline the arrangement of a VTR which is arranged according to this invention as a preferred embodiment thereof. FIG. 3 shows the relation of dial rotation angles (rotation phases) to tape transport speeds obtained with the VTR of FIG. 2.

Referring to FIG. 2, a dial 1 is provided with a rotary encoder (RE) 2. The rotary encoder 2 is arranged to generate a pulse every time the dial 1 is turned a given angle of degree. The pulses thus generated are supplied to an up/down counter 3. The up/down counter 3 is arranged to count up or down the pulses coming from the rotary encoder 2 and to supply the counted values of pulses to a system controller 4.

A capstan driver 5 is arranged to drive a capstan motor 6. A reel driver 7 is arranged to drive a reel motor 8. A drum driver 9 is arranged to drive a drum motor 10. A reference numeral 11 denotes a recording/reproducing circuit. A numeral 12 denotes an input terminal for receiving a video signal to be recorded. A numeral 13 denotes an output terminal for outputting a reproduced video signal. A rotary head RH is arranged to supply and receive signals to and from the recording- /reproducing circuit 11. While only one rotary head RH is shown in the figure, it is of course possible to use two or more rotary heads instead of one.

A magnetic tape T is arranged to be traced by the rotary head RH. A video signal is arranged to be recorded in helical tracks in a manner as shown in FIG. 2.

A manual operation part 14 includes a recording key 14a; a reproducing key 14b; a stop key 14c; and a shuttle key 14d. Information on the operation of these keys is supplied to the system controller 4.

When the VTR is set into a recording mode by operating the recording key 14a, the system controller 4 causes the capstan driver 5 to drive the capstan motor 6 and causes the reel driver 7 to drive the reel motor 8. The tape T is thus transported at a given speed. Further, the system controller 4 causes the drum driver 9 to drive the drum motor 10. The rotary head RH is thus caused to rotate at a given rotation speed.

In the recording mode, the video signal which is supplied through the terminal 12 is processed by the recording/reproducing circuit 11 into a signal form suited for magnetic recording. The signal thus processed is supplied to the rotary head RH. The rotary head RH then records the video signal on the magnetic tape T while forming helical tracks one after another on the tape T.

Further, when the VTR is set into a reproduction mode by operating the reproducing key 14b, the system controller 4 causes the capstan driver 5 to drive the capstan motor 6 at the same speed as in the recording mode and also causes the reel driver 7 to drive the reel motor 8. The tape T is thus transported at the same speed as in the recording mode. The system controller 4 further causes the drum driver 9 to drive the drum motor 10. The rotary head RH is thus caused to rotate at the above-stated given rotation speed.

In the reproduction mode, a video signal which is reproduced by the rotary head RH is supplied to the recording/reproducing circuit 11. The recording/reproducing circuit 11 then performs a signal processing action in a manner reverse to the processing action performed in the recording mode. This process brings the reproduced video signal back into its original signal form. The signal thus processed is output from the output terminal 13.

When the VTR is set into a shuttle mode by operating the shuttle key 14d, the system controller 4 controls the capstan driver 5 and the reel driver 7 in such a way as to transport the tape T at a speed which corresponds to the rotation angle of the dial 1 as will be further described later herein. Other actions of the VTR are performed in the same manner as in the reproduction mode.

In the shuttle mode, the counter 3 is enabled to count the pulses coming from the rotary encoder 2. The system controller 4 then determines the transport speed of the tape T in accordance with the counted value obtained from the counter 3 on the basis of the relation shown in FIG. 3. In other words, the system controller 4 controls the capstan driver 5 and the reel driver 7 in such a way as to have the tape T transported at one of the speeds shown in FIG. 3.

The relation shown in FIG. 3 is described in detail as follows: in the case of the VTR of this embodiment, when the speed used in the recording mode is assumed to be "1", 8/30-fold, 15/30-fold (½-fold), 30/30-fold (1-fold) and 60/30-fold (2-fold) speeds are set as tape transport speeds to be frequently used in the shuttle mode.

When the dial 1 is turned clockwise, for example, the counter 3 counts up the pulses coming from the rotary encoder 2. The tape transport speed varies accordingly as the counted value increases one by one from "0". When the counted value is at "0", the tape transport speed is at "0", that is, the tape T is in repose. The tape transport speed comes to increase to 1/30 of the recording transport speed of the tape T every time the counted value is incremented by one, that is, every time the dial 1 is turned a given angle of degree. In other words, when the counted value is between "2" and "8", the tape transport speed is between values which are 2/30 and 8/30 times as high as the tape transport speed used at the time of recording.

After the counted value "8", when the counted value increases to "9" and to "10" by receiving the pulses from the rotary encoder 2, the tape transport speed remains unchanged by the increase of the counted value and thus remains at the 8/30-fold speed which is 8/30 times as high as the tape transport speed at the time of recording.

When the counted value increases to "11" and to "12" by receiving the pulses from the rotary encoder 2, the tape transport speed increases to the 9/30-fold speed and the 10/30-fold speed which are 9/30 and 10/30 times as high as the tape transport speed at the time of recording, respectively. The tape transport speed becomes the 15/30-fold speed when the counted value reaches "17".

After the counted value "17", when the counted value increases to "18" and then to "19" by receiving the pulses from the rotary encoder 2, the tape transport speed does not change and remains at the 15/30-fold speed, i.e., one-half of the tape transport speed at the time of recording.

When the counted value further increases, the tape transport speed changes from one value over to another at every increment of the counted value at an increment rate of a 2/30-fold speed within a range from the 16/30-fold speed to the 30/30-fold speed, as shown in FIG. 3. Then, at the time of the counted values "27", "28" and "29", the tape transport speed is fixed at the 30/30-fold speed.

The tape transport speed changes from one speed over to another every time the counted value is further incremented by one. As shown in FIG. 3, within a range from the 32/30-fold speed to the 60/30-fold speed, the tape transport speed increases at a stepwise increment rate of a 4/30-fold speed every time the counted value is incremented by one. Further, within a range of the counted values from "37" to "39", the tape transport speed is fixed to the 60/30-fold speed. After this range, the tape transport speed increases accordingly as the counted value is further incremented in the same manner as mentioned above.

In a case where the dial 1 is turned counter-clockwise, the counter 3 counts down the pulses coming from the rotary encoder 2. As a result, the tape transport speed decreases. The relation of the counted value to the tape transport speed obtained in that case is also as shown in FIG. 3.

The following describes changes taking place in the tape transport speed when the dial 1 is turned to a given degree at a time: in this instance, the rotary encoder 2 is assumed to generate 150 pulses when the dial 1 makes one rotation. Therefore, the dial 1 must be turned 2.4 degrees in order to have one pulse generated by the rotary encoder 2. The counted value by the counter 3 is at "0" if the dial 1 is in a given position of origin or immediately after the shuttle mode is set by means of the shuttle key 14d. Then, the tape transport speed is also at "0". Under this condition, when the dial 1 is turned 2.4 degrees clockwise, one pulse is generated to change the counted value to "1" and the tape transport speed becomes the 1/30-fold speed. When the dial 1 is turned 4.8 degrees, the tape transport speed becomes the 2/30-fold speed. The tape transport speed changes within a range from the 3/30-fold speed to the 8/30-fold speed accordingly as the dial 1 is turned within a range from 7.2 degrees to 19.2 degrees. However, the tape transport speed remains unchanged when the rotation angle of the dial 1 changes to 21.6 degrees and to 24 degrees. When the rotation angle of the dial 1 becomes 26.4 degrees, the tape transport speed changes to the 9/30-fold speed. In other words, the tape transport speed remains unchanged from the 8/30-fold speed when the dial 1 is turned within the range of 7.2 degrees from 19.2 to 26.4 degrees. The tape transport speed likewise remains unchanged when the dial 1 is turned within the range of 7.2 degrees at the 15/30-fold speed, the 30/30-fold speed and the 60/30-fold speed. Therefore, a range of rotation angles of the dial 1 within which the tape transport speed is kept unchanged is 7.2 degrees for the tape transport speeds which are to be frequently used and is 2.4 degrees for other tape transport speeds. Therefore, the VTR can be easily set at any tape transport speed that is to be frequently used despite of the many tape transport speeds arranged to be selectable. This arrangement thus enables the shuttle function or the variable function to be easily carried out.

In the foregoing description of the embodiment, the values of the tape transport speeds and those of the tape transport speeds to be frequently used are given merely by way of example. This invention is not limited to these values. Further, the number of pulses per one rotation of the dial 1, the range of rotation angles of the dial within which the tape transport speed is kept unchanged, etc., are also given by way of example. In accordance with this invention, these values may be variously changed and combined as desired.

Further, the rotation angle of the dial is converted into a pulse number by means of the rotary encoder. However, this method of course can be replaced with some other suitable method.

As described in the foregoing, in the mode of carrying out the shuttle function or the variable function, the VTR of this embodiment has the tape-speed-unchanging range of dial rotation angles arranged to be larger for the tape transport speeds to be frequently used than for other speeds. Therefore, the position of the dial is easily adjustable to any tape transport speed that is frequently used. The operability of the VTR thus can be enhanced in terms of the shuttle function and the variable function.

What is claimed is:

1. A tape recorder comprising:
a) reproducing means for reproducing an information signal recorded on a tape-shaped recording medium;
b) transport means for transporting the tape-shaped recording medium;
c) a dial; and
d) control means for setting a transport speed of the tape-shaped recording medium transported by said transport means at one of a plurality of speeds according to a rotation phase angle of said dial, said control means being arranged to be operable while said reproducing means is in operation, and said control means including means for establishing a plurality of predetermined specific speeds within the plurality of speeds having a relatively greater phase angle of rotation of said dial than the phase angle rotation of said dial for the plurality of speeds not at said predetermined specific speeds.

2. A tape recorder according to claim 1, wherein the plurality of predetermined specific speeds includes a speed which is the same as the transport speed at which the tape-shaped recording medium is transported when the information signal is recorded.

3. A tape recorder according to claim 2, wherein the plurality of predetermined specific speeds includes a speed which is one half of the transport speed at which the tape-shaped recording medium is transported when the information signal is recorded.

4. A tape recorder according to claim 2, wherein the plurality of predetermined specific speeds includes a speed which is two times as high as the transport speed at which the tape-shaped recording medium is transported when the information signal is recorded.

5. A tape recorder according to claim 1, wherein a speed difference between adjacent speeds among the plurality of speeds is arranged to become larger as the adjacent speeds become higher.

6. A tape recorder according to claim 1, wherein said control means includes a rotary encoder arranged to output a pulse every time said dial is turned a predetermined angle of degree, a counter arranged to count pulses output from said rotary encoder, and a control circuit arranged to control said transport means according to a counted value provided by said counter.

7. A tape recorder according to claim 6, wherein said counter is arranged to be enabled to count the pulses output from said rotary encoder only when said reproducing means is in operation.

8. A tape recorder according to claim 1, further comprising manual operation means for rendering said control means and said reproducing means operative.

9. A tape recorder according to claim 1, further comprising recording means for recording an information signal on the tape-shaped recording medium.

10. A tape recorder comprising:
a) transport means for transporting a tape-shaped recording medium;
b) a dial; and
c) control means for setting a transport speed of the tape-shaped recording medium transported by said transport means at one of a plurality of speeds according to a rotation phase angle of said dial, and said control means including means for establishing a plurality of predetermined specific speeds within the plurality of speeds having a relatively greater phase angle of rotation of said dial than the phase angle of rotation of said dial for the plurality of speeds not at said specific speeds.

11. A tape recorder comprising:
a) transport means for transporting a tape-shaped recording medium;
b) operation means for permitting a manual operation;
c) pulse generating means for generating pulses in response to the operation of said operation means;
d) a counter for counting the pulses generated by said pulse generating means; and e) control means for setting a transport speed of the tape-shaped recording medium transported by said transport means at one of a plurality of speeds according to respective count values provided by said counter, said control means further responding to count values at predetermined counts of said counter corresponding to a plurality of predetermined specific speeds within the plurality of speeds in which said predetermined specific speeds do not change, whereby in the operation of said manual operation means there is a higher degree of recognition at the plurality of predetermined specific speeds.

12. A tape recorder according to claim 11, wherein said operation means includes a dial, and wherein said pulse generating means is arranged to generate a pulse every time said dial is turned a predetermined angle of degree.

13. A reproducing apparatus comprising:
a) reproducing means operable for reproducing an information signal recorded on a recording medium;
b) moving means for moving the recording medium;
c) a dial; and
d) control means for setting a moving speed of the recording medium moved by said moving means at one of a plurality of speeds according to a rotation phase angle of said dial, said control means being arranged to be operable while said reproducing means is in operation, and said control means including means for establishing a plurality of predetermined specific speeds within the plurality of speeds having a relatively greater phase angle of rotation of said dial than the phase angle rotation of said dial for the plurality of speeds not at said predetermined specific speeds.

14. A reproducing apparatus according to claim 13, wherein the plurality of predetermined specific speeds includes a speed which is the same as the moving speed at which the recording medium is moved when the information signal is recorded.

15. A reproducing apparatus according to claim 14, wherein the plurality of predetermined specific speeds includes a speed which is one half of the moving speed at which the recording medium is moved when the information signal is recorded.

16. A reproducing apparatus according to claim 14, wherein the plurality of predetermined specific speeds includes a speed which is two times as high as the moving speed at which the recording medium is moved when the information signal is recorded.

17. A reproducing apparatus according to claim 13, wherein a speed difference between adjacent speeds among the plurality of speeds is arranged to become larger as the adjacent speeds become higher.

18. A reproducing apparatus according to claim 13, wherein said control means includes a rotary encoder arranged to output a pulse every time said dial is turned through a predetermined angle, a counter arranged to count pulses output from said rotary encoder, and a control circuit arranged to control said moving means according to a counted value provided by said counter.

19. A reproducing apparatus according to claim 18, wherein said counter is arranged to be enabled to count the pulses output from said rotary encoder only when said reproducing means is in operation.

20. A reproducing apparatus according to claim 13, further comprising manual operation means for rendering said control means and said reproducing means operative.

* * * * *